US012692901B2

(12) United States Patent
Rogg

(10) Patent No.: US 12,692,901 B2
(45) Date of Patent: Jul. 28, 2026

(54) METHOD FOR LUBRICATING A BEARING, LUBRICANT SUPPLY SYSTEM AND WIND TURBINE

(71) Applicant: Nordex Energy SE & Co. KG, Hamburg (DE)

(72) Inventor: Andreas Rogg, Hamburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/868,655

(22) PCT Filed: May 25, 2023

(86) PCT No.: PCT/EP2023/064029
§ 371 (c)(1),
(2) Date: Nov. 22, 2024

(87) PCT Pub. No.: WO2023/232620
PCT Pub. Date: Dec. 7, 2023

(65) Prior Publication Data
US 2025/0354583 A1 Nov. 20, 2025

(30) Foreign Application Priority Data
May 31, 2022 (EP) .................................... 22176319

(51) Int. Cl.
*F16C 33/66* (2006.01)
(52) U.S. Cl.
CPC ...... *F16C 33/6625* (2013.01); *F16C 33/6674* (2013.01); *F16C 2300/14* (2013.01); *F16C 2360/31* (2013.01)

(58) Field of Classification Search
CPC .......................... F16C 33/6625; F16C 33/6674
See application file for complete search history.

(56) References Cited

U.S. PATENT DOCUMENTS

| | | | | |
|---|---|---|---|---|
| 8,640,528 | B2 * | 2/2014 | Ganji | F16C 33/6674 73/53.05 |
| 9,316,252 | B2 * | 4/2016 | Emlind | G01M 13/045 |
| 10,975,908 | B1 * | 4/2021 | Reichhart | F16C 19/386 |

(Continued)

FOREIGN PATENT DOCUMENTS

| | | |
|---|---|---|
| CN | 108291529 A | 7/2018 |
| CN | 108533936 A | 9/2018 |

(Continued)

OTHER PUBLICATIONS

DE102019217534—Machine Translation (Year: 2019).*

(Continued)

*Primary Examiner* — Michael A Riegelman
(74) *Attorney, Agent, or Firm* — Walter Ottesen, P.A.

(57) ABSTRACT

A method for lubricating a bearing, in particular a rotor bearing, of a wind turbine, includes: determining a load condition of a load acting on the bearing, determining an operating condition of the bearing dependent on the determined load condition, determining a damage potential of the bearing dependent on the determined operating condition, providing a lubricant supply signal dependent on the determined damage potential, wherein the lubricant supply signal includes information about supplying lubricant to the bearing.

22 Claims, 6 Drawing Sheets

(56) References Cited

U.S. PATENT DOCUMENTS

| | | | |
|---|---|---|---|
| 11,692,888 B2 * | 7/2023 | Glaentz | F16C 19/522 |
| | | | 384/448 |
| 11,703,183 B2 * | 7/2023 | Choquet | F16N 13/00 |
| | | | 184/7.4 |
| 11,983,000 B2 * | 5/2024 | Gebauer | G05B 23/0267 |
| 12,006,982 B2 * | 6/2024 | Snell | F04D 29/063 |
| 12,281,815 B2 * | 4/2025 | Biltcliffe | F24F 6/04 |
| 2003/0115977 A1 * | 6/2003 | Holweg | F16C 19/52 |
| | | | 702/113 |
| 2011/0265569 A1 * | 11/2011 | Ganji | F16C 33/6688 |
| | | | 73/587 |
| 2012/0221153 A1 * | 8/2012 | Emlind | F16C 19/52 |
| | | | 702/45 |
| 2014/0360743 A1 | 12/2014 | Muuttonen | |
| 2015/0252944 A1 * | 9/2015 | Kreutzkaemper | F16N 7/40 |
| | | | 184/7.4 |
| 2017/0045040 A1 * | 2/2017 | Czichowski | F03D 80/70 |
| 2017/0205313 A1 * | 7/2017 | Holweger | G01M 13/04 |
| 2018/0335019 A1 | 11/2018 | Knudsen et al. | |
| 2020/0362828 A1 * | 11/2020 | Soerensen | F03D 80/70 |
| 2021/0270249 A1 * | 9/2021 | Pedersen | F03D 9/25 |
| 2022/0341817 A1 * | 10/2022 | van der Ham | F16C 33/34 |
| 2023/0063769 A1 * | 3/2023 | Guan | G01L 1/2281 |
| 2024/0175769 A1 * | 5/2024 | Breuker | G01L 1/242 |
| 2025/0102017 A1 * | 3/2025 | van der Ham | F03D 17/032 |

FOREIGN PATENT DOCUMENTS

| | | | | |
|---|---|---|---|---|
| DE | 10 2015 215 302 A1 | 3/2017 | | |
| DE | 102019217534 A1 * | 5/2021 | | F16N 7/38 |
| EP | 1 250 550 B1 | 7/2006 | | |
| EP | 1 801 415 A2 | 6/2007 | | |
| EP | 2 484 900 A1 | 8/2012 | | |
| EP | 2 551 578 A1 | 1/2013 | | |
| EP | 2 617 995 A1 | 7/2013 | | |
| EP | 2 657 556 A2 | 10/2013 | | |
| EP | 2 916 019 A2 | 9/2015 | | |
| EP | 2 652 322 B1 | 4/2016 | | |
| EP | 3 018 375 A1 | 5/2016 | | |
| EP | 3 088 790 A1 | 11/2016 | | |
| EP | 3 112 626 A1 | 1/2017 | | |
| EP | 3 179 123 A1 | 6/2017 | | |
| EP | 1 723 338 B1 | 5/2018 | | |
| EP | 3 123 259 B1 | 1/2019 | | |
| EP | 3 627 134 A1 | 3/2020 | | |
| EP | 3 670 900 A1 | 6/2020 | | |
| EP | 3 702 591 A1 | 9/2020 | | |
| EP | 3 544 925 B1 | 5/2021 | | |
| EP | 3943221 A1 * | 1/2022 | | F16C 33/6625 |
| EP | 2 626 679 A1 | 8/2023 | | |
| JP | 3313441 B2 * | 8/2002 | | |
| WO | 01/55634 A2 | 8/2001 | | |
| WO | 2010/085971 A1 | 8/2010 | | |
| WO | 2011/025430 A1 | 3/2011 | | |
| WO | WO-2015099384 A1 * | 7/2015 | | F01M 1/02 |

OTHER PUBLICATIONS

International Search Report of the European Patent Office dated Aug. 1, 2023 or international application PCT/EP2023/064029 on which this application is based.

Written Opinion of the International Searching Authority dated Aug. 1, 2023 for international application PCT/EP2023/064029 on which this application is based.

Greiner, K. et al., "Main Bearing Preventive Maintenance & Condition Monitoring Techniques", SKF Group, NREL CBM Workshop 2011, Oct. 5, 2011, pp. 1 to 27.

Extended European Search Report of the European Patent Office dated Nov. 7, 2022 in European patent application 22176319.6 on which this application is based.

* cited by examiner

METHOD FOR LUBRICATING A BEARING, LUBRICANT SUPPLY SYSTEM AND WIND TURBINE

CROSS-REFERENCE TO RELATED APPLICATIONS

This application is a continuation application of international patent application PCT/EP2023/064029, filed May 25, 2023, designating the United States and claiming priority from European application 22176319.6, filed May 31, 2022, and the entire content of both applications is incorporated herein by reference.

TECHNICAL FIELD

The disclosure relates to a method for lubricating a bearing, in particular a rotor bearing of a wind turbine. The disclosure further relates to a lubricant supply system for a wind turbine. The disclosure further relates to a wind turbine, in particular a wind turbine including a lubricant supply system.

BACKGROUND

A wind turbine may include a rotor that includes a rotatable rotor hub assembly having multiple rotor blades. The rotor blades transform wind energy into a drive torque that drives a generator via a drive train.

SUMMARY

It is desirable to provide a method for lubricating a bearing of a wind turbine, the method providing reliable lubrication of the bearing. It is further desirable to provide a lubricant supply system for a wind turbine which provides reliable lubrication of a bearing. It is further desirable to provide a wind turbine that enables reliable operation.

Embodiments of the disclosure provide a method for lubricating a bearing of a wind turbine. For example, the bearing is a rotor bearing. The method includes:
- determining a load condition of a load acting on the bearing,
- determining an operating condition of the bearing dependent on the determined load condition,
- determining a damage potential of the bearing dependent on the determined operating condition,
- providing a lubricant supply signal dependent on the determined damage potential, wherein the lubricant supply signal includes information about supplying lubricant to the bearing.

The load acting on the bearing could be a load acting in a radial and/or an axial direction. For example, the type and/or magnitude of the load is determined based on data available from a wind turbine control system, for example a so-called Supervisory Control and Data Acquisition (SCADA). In addition or as an alternative, sensor data can be used to determine the load. Specific properties of the wind turbine can also be used to determine the load condition, for example a rotor weight.

The operating condition of the bearing is determined based on the determined load condition to determine the damage potential of the bearing. Depending on the operating condition of the bearing, a higher or lower damage potential may be determined. The operating condition is, for example, an indication of a condition in which the rotor bearing is operating.

The damage potential, for example indicates the risk that the bearing will be damaged (or worn) during operation in the determined operating condition.

The lubricant supply signal is provided dependent on the determined damage potential. For example, if more lubricant, like grease or oil, is necessary, the lubricant supply signal includes such information. For example, the lubricant supply signal includes information on how much additional lubricant should be provided in addition to the normal amount of lubricant provided as a default independent of the load condition. Typically, the higher the risk that the bearing will be damaged, the more additional lubricant should be provided. Depending on the lubricant supply signal, a lubricant supply system provides lubricant to the bearing.

The method enables better lubrication conditions of the bearing, in particular of the rotor bearing, by adapting the lubrication conditions to current bearing operating conditions. This enables less wearing of the bearing and thus increases the lifetime of the bearing. This leads to a reduction of the bearing failure rate and thus to a reduction of the maintenance costs of the wind turbine.

According to further embodiments, at least one dynamic parameter is determined based on a model calculation and/or based on sensor data provided by at least one sensor. The load condition is determined dependent on the at least one dynamic parameter. The parameter may be a wind speed, a temperature, a blade pitch angle or any other parameter that varies during use of the wind turbine. Model calculation can be used to determine the parameter on the basis of other variables. Thus, it is not necessary to directly measure the load acting on the bearing. Instead, the load condition is determined indirectly via the determination of at least one dynamic parameter, wherein the at least one dynamic parameter is based on measured variables and/or known variables.

According to embodiments, the load condition and/or the operating condition is determined based on at least one of:
- a rotation speed of a rotor of the wind turbine,
- a rotor power, a power generated by the wind turbine,
- a wind speed,
- an air density,
- a bearing temperature,
- a difference between a bearing temperature and a temperature within a nacelle of the wind turbine,
- a blade pitch angle, and
- a load acting on at least one rotor blade.

According to further embodiments the load condition is determined dependent on at least one static parameter, in particular at least one of a wind shear, a rotor property and a bearing property. The rotor property and/or the bearing property, for example, includes a value of a weight.

According to further embodiments the load condition is determined by determining an axial load and a radial load applied on the bearing. The operating condition is determined dependent on the determined axial load and/or radial load. In particular, the operating condition is determined dependent on a ratio between the determined axial load and the determined radial load. In particular, the ratio between the axial load and the radial load is a reliable indicator to determine the damage potential. For example, the axial load is determined based on a power generated by the wind turbine and/or on a wind speed. The radial load for example is determined based on a power generated by the wind turbine and/or on a rotor property, in particular a rotor weight. Thus, it is not necessary to directly measure the axial and/or radial load. Instead, the axial load and/or the radial load can be determined based on variables which are already available from a wind turbine control system, on variables measured by sensors present in the wind turbine and/or based on known values.

According to embodiments, the operating condition is determined dependent on the determined load condition and on at least one of a rotation speed of a rotor of the wind turbine, a bearing temperature and a difference between a bearing temperature and a temperature within a nacelle of the wind turbine.

According to further embodiments the lubricant supply signal includes a quantity of lubricant supply to the bearing dependent on the determined damage potential. In addition or as an alternative, the lubricant supply signal includes information about a frequency of lubricant supplied to the bearing dependent on the determined damage potential. In addition or as an alternative, the lubricant supply signal includes information about a region of the bearing where the lubricant is applied depending on the determined damage potential.

Thus, it is possible to apply a desired amount of lubricant at desired time intervals at desired regions of the bearing.

According to further embodiments, the determined damage potential is added to a damage sum. The damage sum cumulates the determined damage potential over time. The lubricant supply signal is provided dependent on the determined damage potential and on the damage sum and/or a maintenance signal is provided dependent on the determined damage sum. The maintenance signal includes information about a maintenance in addition to supplying lubricant to the bearing. Thus, depending on the determined damage potential, a reliable maintenance is realized. The damage potential is cumulative over the lifetime and dependent on the real operation of the bearing, maintenance can take place sooner or later depending on what is required.

According to further embodiments, the operating condition is compared with at least one predefined threshold to determine the damage potential. Optionally, the operating condition is classified based on the comparison between the operating condition and the at least one predefined threshold into one of a plurality of classes, wherein each class corresponds to a different damage potential. For example, an operating condition below the predefined threshold indicates no particular damage potential and no additional lubrication in addition to the standard lubrication as necessary. An operating condition above the predefined threshold for example indicates that additional lubricant should be applied to lower the risk of increased wearing of the bearing and/or to reduce wearing over a certain period of time.

According to further embodiments, the bearing is a roller bearing, in particular a spherical roller bearing or a tapered roller bearing. The roller bearing can be a single row roller or a multiple row roller bearing.

According to an embodiment, a lubricant supply system for a wind turbine includes a control unit. The lubricant supply system includes a lubricant supply device. The control unit is configured to execute the method for lubricating as described herein. For example, the control unit includes a processor, memory and a computer storage to execute the method. The control unit is configured to control the lubricant supply device. For example, the control unit and the lubricant supply device are coupled with each other such that control signals can be provided to the lubricant supply system by the control unit.

For example, the lubricant supply device includes a plurality of lubricant supply units to supply lubricant to different regions of the bearing. This enables a lubrication of the device at the different regions dependent on the determined damage potential.

According to an embodiment, a wind turbine includes a bearing, in particular a rotor bearing. The wind turbine includes a lubricant supply system as described herein. The lubricant supply device of the lubricant supply system is coupled with the bearing to supply lubricant to the bearing. For example, the bearing is a roller bearing, in particular a spherical roller bearing or a tapered roller bearing.

The embodiments described in the above refer to a single bearing. However, it is to be understood that the present invention may be correspondingly used for more than one bearing, in particular for a wind turbine including a plurality of rotor bearings. Furthermore, the present invention may be used for roller bearings, in particular spherical roller bearings or tapered roller bearings, as well as for sliding bearings.

BRIEF DESCRIPTION OF DRAWINGS

The invention will now be described with reference to the drawings wherein.

DETAILED DESCRIPTION

Figure 1:
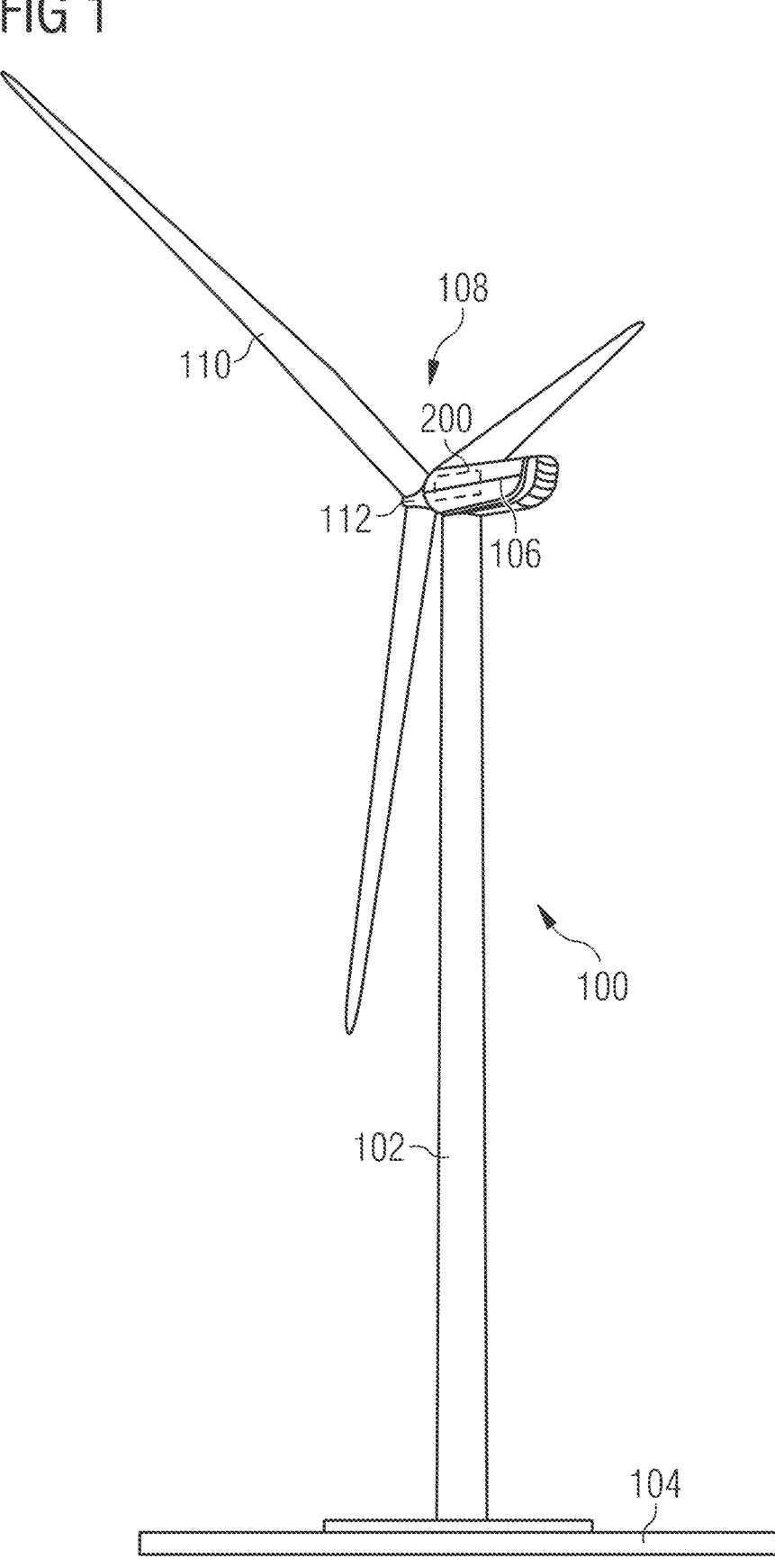
FIG. 1 is a schematic view of a wind turbine according to an embodiment.
Figures 2, 3:
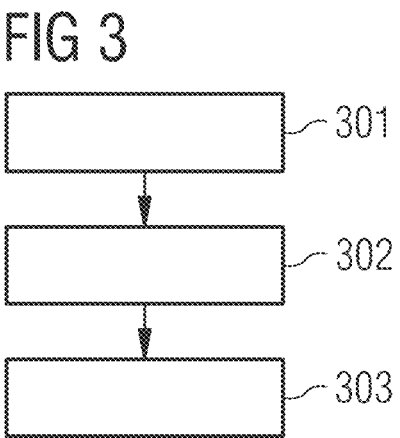
FIG. 2 is a schematic view of a lubricant supply system and further components of the wind turbine according to an embodiment.
FIG. 3 is a schematic view of a flowchart of a method according to an embodiment.

As shown in FIG. 1, a wind turbine 100 includes a tower 102. The tower 102 is connected to a foundation 104 fixed on a ground. The foundation 104 is formed on and supported by the ground. On a top end of the tower 102 opposite to the foundation 104 a nacelle 106 is arranged. The nacelle 106 houses the drive train. Inside the nacelle 106, for example, a generator is arranged which is connected via the drive train with a rotor 108, the drive train including, for example, a gearbox and a rotor shaft 105 (FIG. 2). The rotor 108 includes several rotor blades 110. The rotor blades 110 are mounted on a rotor hub 112. The rotor hub 112 is connected to the rotor shaft 105.

The rotor 108 is driven in operation by an airflow, for example wind. The rotational movement of the rotor 108 is transmitted via the drive train to the generator. The generator converts the energy of the rotor 108 into electrical energy.

FIG. 2 schematically shows the nacelle 106 with the rotor shaft 105. The rotor shaft 105 is held and rotatably supported by a bearing 103, also called a rotor bearing. According to embodiments the rotor shaft 105 is held and rotatably supported by more than one rotor bearing 103, for example two rotor bearings or more.

A lubricant supply system 200 is arranged to provide lubricant like grease or oil to the bearing 103. The lubricant supply system includes a control unit 201, which for example includes a processor and other computer hardware to execute software and computer programs.

A lubricant supply device 202 is provided, which for example includes one or more lubricant supply units 203. The lubricant supply units 203 each include, for example, one or more of a pump, a supply channel, a lubricant tank, and other elements necessary to provide the lubricant to the bearing 103. By the plurality of lubricant supply units 203, it is possible to provide the lubricant to different regions 107 of the bearing 103. The regions 107 are, for example, arranged along the circumference of the bearing 103 in different positions. Alternatively or additionally, the regions 107 are, for example, arranged along the width of the bearing 103. Thus, it is possible to provide lubricant to the bearing 103, not only via one single access but via a plurality of lubricant supplies.

A plurality of sensors 211, 212, 213 is arranged. The sensors 211, 212 and 213 are shown as examples of sensors. Of course, more than three or less than three sensors may be provided and different kinds of sensors may be used.

For example, the sensor 211 is a sensor which is arranged outside the nacelle 106. For example, the sensor 211 is used to measure wind speed, a temperature outside the nacelle 106, air density or other variables that can be used to determine a load acting on the bearing 103.

For example, the sensors 212 and 213 are arranged inside the nacelle 106. For example, the sensor 213 is directly positioned at the bearing 103 to measure conditions of the bearing like bearing temperature. The sensor 212 for example includes a sensor to determine conditions inside the nacelle 106, like a temperature within the nacelle 106 and/or a rotation speed of the shaft 105. Further, sensors can be provided to measure, for example, a load acting on at least one rotor blade 110, a blade pitch angle, a rotor power, a power generated by the wind turbine and/or other conditions. Further conditions, in particular static parameters, may be stored in a storage of the control unit 201. This may include information about the rotor weight, the kind of bearing and/or other information which can be used to determine a load acting on the bearing 103.

The plurality of sensors 211, 212 and 213 may be part of the lubricant supply system 200. Alternatively, at least part of the plurality of sensors 211, 212 and 213 may be part of or in connection with the wind turbine control system. In this case, the lubricant supply system 200 receives the sensor data and/or dynamic parameters determined based on the sensor data from the wind turbine control system. Furthermore, the lubricant supply system 200 may also receive static parameters from the wind turbine control system.

FIG. 3 shows a flowchart of a method for lubricating the bearing 103.

In a step 301 sensor data and/or static parameters are determined. Sensor data, for example, includes at least one of rotor speed, rotor power, hub wind speed, air density, bearing temperature and other variables. Static parameters in particular are specific for the wind turbine 100 and for example include at least one of a wind shear, a rotor weight and other site-specific static parameters. In particular, step 301 additionally includes the determination of dynamic parameters based on a model calculation and/or based on the sensor data.

In a step 302 a load condition of a load acting on the bearing 103 is determined based on the data provided in step 301. For example, the value of a radial load acting on the bearing 103 is determined and the value of an axial load acting on the bearing 103 is determined. Depending on the determined load condition, an operating condition and a damage potential of the bearing 103 are determined.

In a step 303 a lubricant supply signal is provided by the control unit 201 to the lubricant supply device 202 to supply lubricant to the bearing 103 depending on the damage potential that has been determined in step 302.

It is possible that the supply of the lubricant starts or increases automatically in the case that the operating condition exceeds or falls below a predefined threshold value corresponding to a high damage potential. It is also possible that an information signal is output and lubrication is started or increased manually by an operator in response to the information. For example, the lubricant is supplied to flush the bearing 103 and to re-grease the bearing 103 in order to remove wear particles.

According to embodiments, in step 302 the determined damage potential is added to a damage sum. The damage sum cumulates the determined damage potential over time.

In step 303 a maintenance signal can be output dependent on the damage sum, for example in case the damage sum exceeds a predefined threshold. Such a maintenance signal may include an information indicating to an operator to perform a maintenance operation, such as a manual overgreasing and/or a bearing flushing and regreasing in order to remove wear particles from the bearing 103. It is also possible to (automatically) supply additional lubricant to the bearing 103 dependent on the value of the damage sum. In particular, the lubricant supply increase may lead to an overgreasing which enables the removal of wear particles in the bearing 103.

Figure 4:
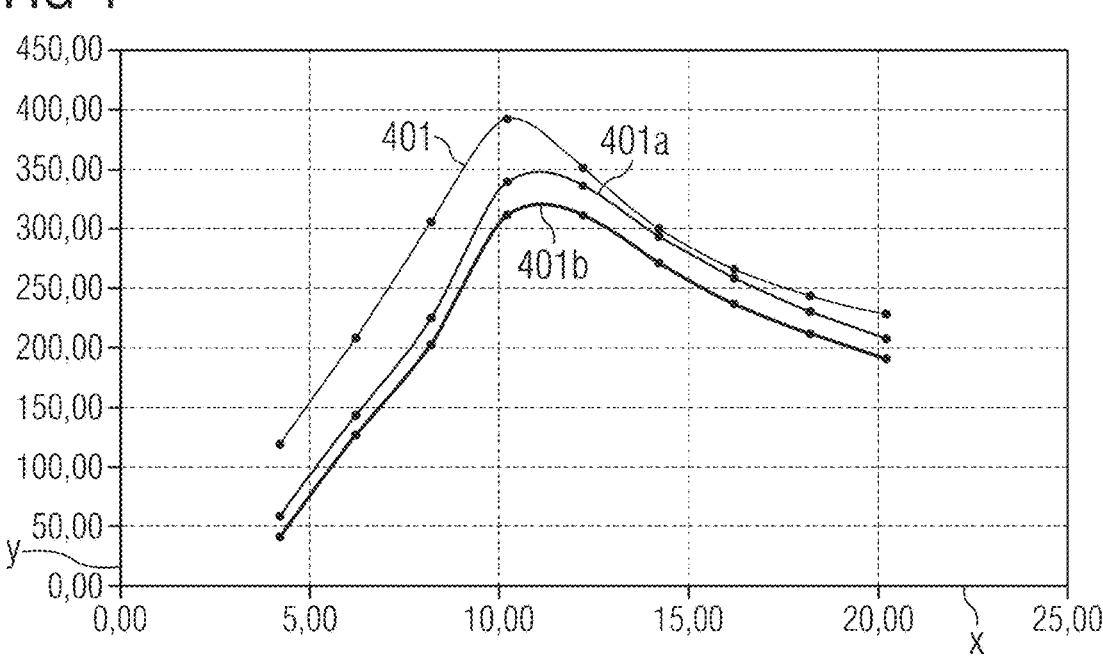
FIGS. 4 to 7 are schematic views of curves representing load conditions.

FIG. 4 shows curves of determined axial loads 401, 401a, 401b on the bearing 103. The x-axis indicates the wind speed and the y-axis indicates the axial load in kilonewton. Depending on the wind speed, the axial load rises initially and then falls again. Different courses of the curve of the axial load 401, 401a, 401b are however possible.

The curves 401, 401a and 401b correspond to characteristic curves which are obtained by calculations for different wind speeds. In particular, the characteristic curves are obtained by interpolating a plurality of points, wherein each point results from a calculation for a specific wind speed.

For example, the points of curve 401 are obtained by an elaborate load calculation using for example a multibody simulation. The points of curve 401a are obtained by an estimation formula based on the wind speed and on a mechanical power 405 of the rotor 108, wherein the mechanical power 405 is calculated based on an electrical power 406 generated by the wind turbine. The points of curve 401b are obtained by an estimation formula based on the wind speed and on the electrical power 406 (see for example step 818 below).

The calculation to obtain curve 401a is easier but may be less accurate than the elaborate load calculation to obtain curve 401. Furthermore, the calculation to obtain curve 401b is easier but may be less accurate than the calculation to obtain curve 401a.

Figure 5:
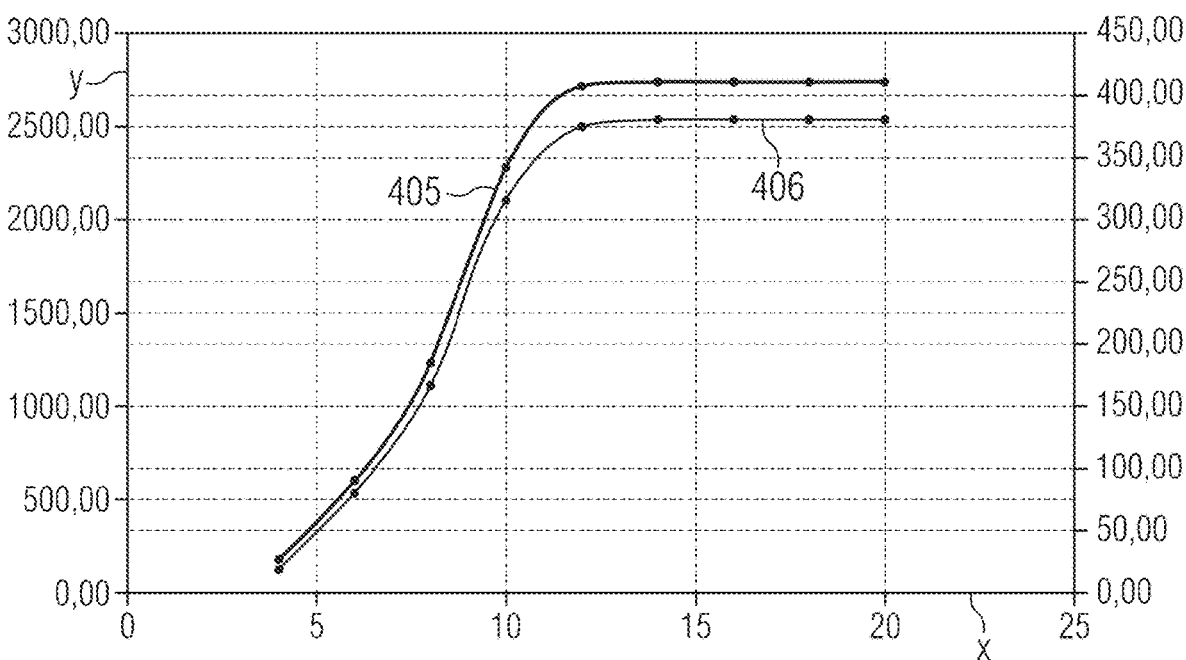

FIG. 5 schematically shows curves of a mechanical power 405 of the rotor 108 and an electrical power 406 generated by the wind turbine. The mechanical power 405, for example, is dependent on rotor speed and torque. The electrical power 406, for example, can be measured and determined. The x-axis of FIG. 4 indicates the wind speed. Thus, the mechanical power 405 and the electrical power 406 rise with increasing wind speed until the rotor blades 110 are pitched and the power 405, 406 is kept constant.

Similar to FIG. 4, the curves of FIG. 5 correspond to characteristic curves which are obtained by calculations for different wind speeds. In particular, the characteristic curves are obtained by interpolating a plurality of points, wherein each point results from a calculation for a specific wind speed.

Figure 6:
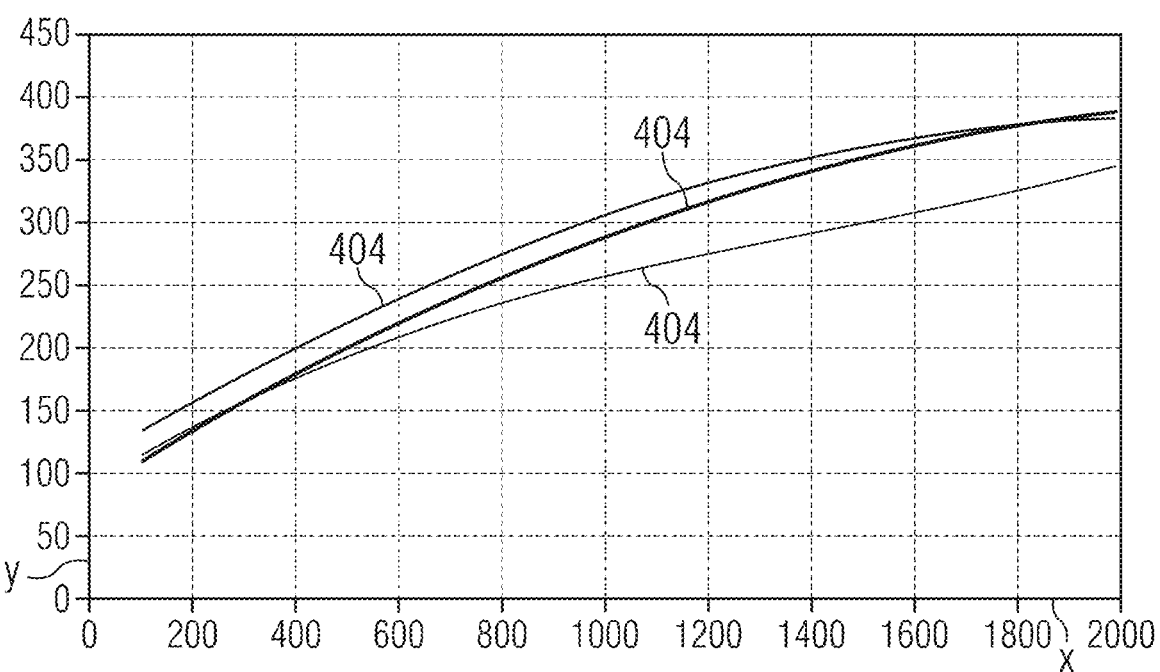

FIG. 6 shows examples of curves of axial loads 404 on the bearing 103. The x-axis indicates the electrical power 406 in kilowatt and the y-axis indicates the axial load 404 in kilonewton. In particular, each curve of FIG. 6 may be obtained by combining a curve of FIG. 4, in particular curve 401, with the curve of electrical power 406 of FIG. 5 (such that the wind speed is eliminated). Each curve 404 corresponds to the axial load on a bearing 103 for a different type of wind turbine.

Figure 7:
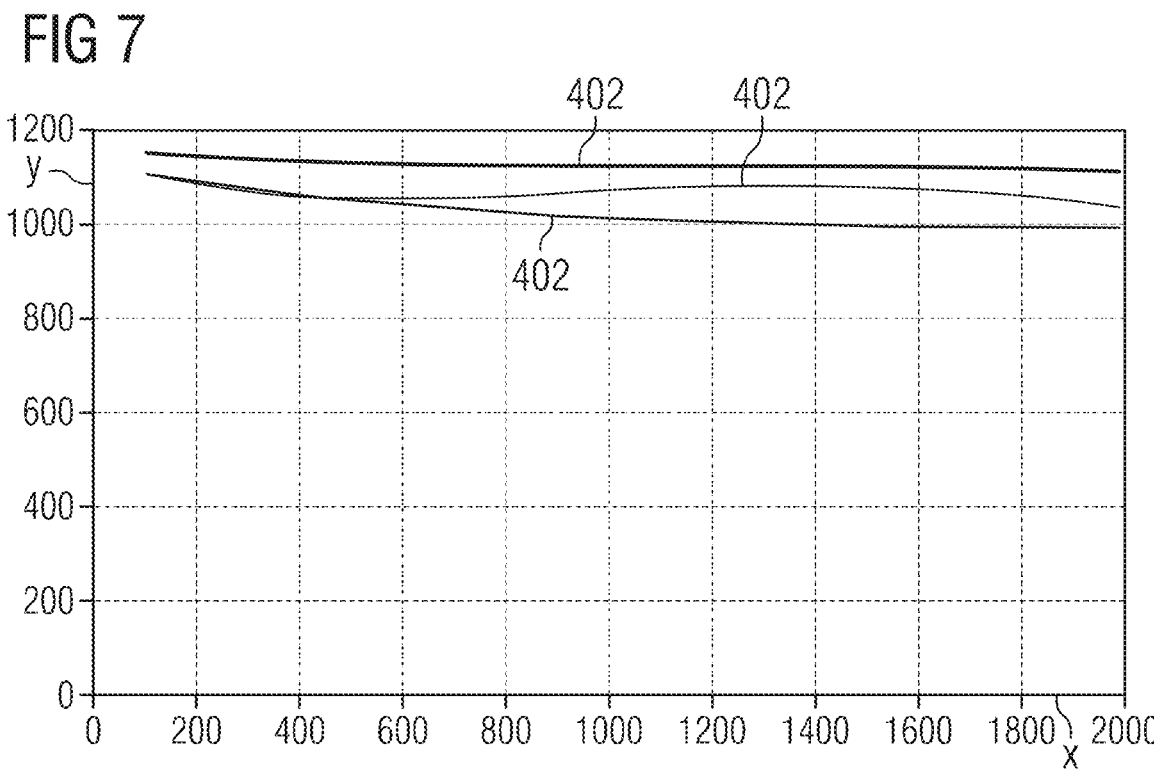

FIG. 7 schematically shows curves of a radial load 402 on the bearing 103. The x-axis of FIG. 7 indicates the electrical power 406 in kilowatt and the y-axis indicates the radial load 402 in kilonewton. Similar to the curves of FIG. 6, each curve of FIG. 7 may for example be obtained by combining a curve of radial load which depends on the wind speed with the curve of electrical power 406 of FIG. 5 (such that the wind speed is eliminated). Each curve 402 corresponds to the radial load on a bearing 103 for a different type of wind turbine.

Alternatively to the elaborate load calculation and to the estimation formulas referred to in the above, it is also possible to use a machine learning model to determine the values for the axial load 401 and the radial load 402.

The characteristic curves of axial load and radial load may for example be stored in a storage control unit 201, such that they can be used for the determination of the load condition.

Figure 8:
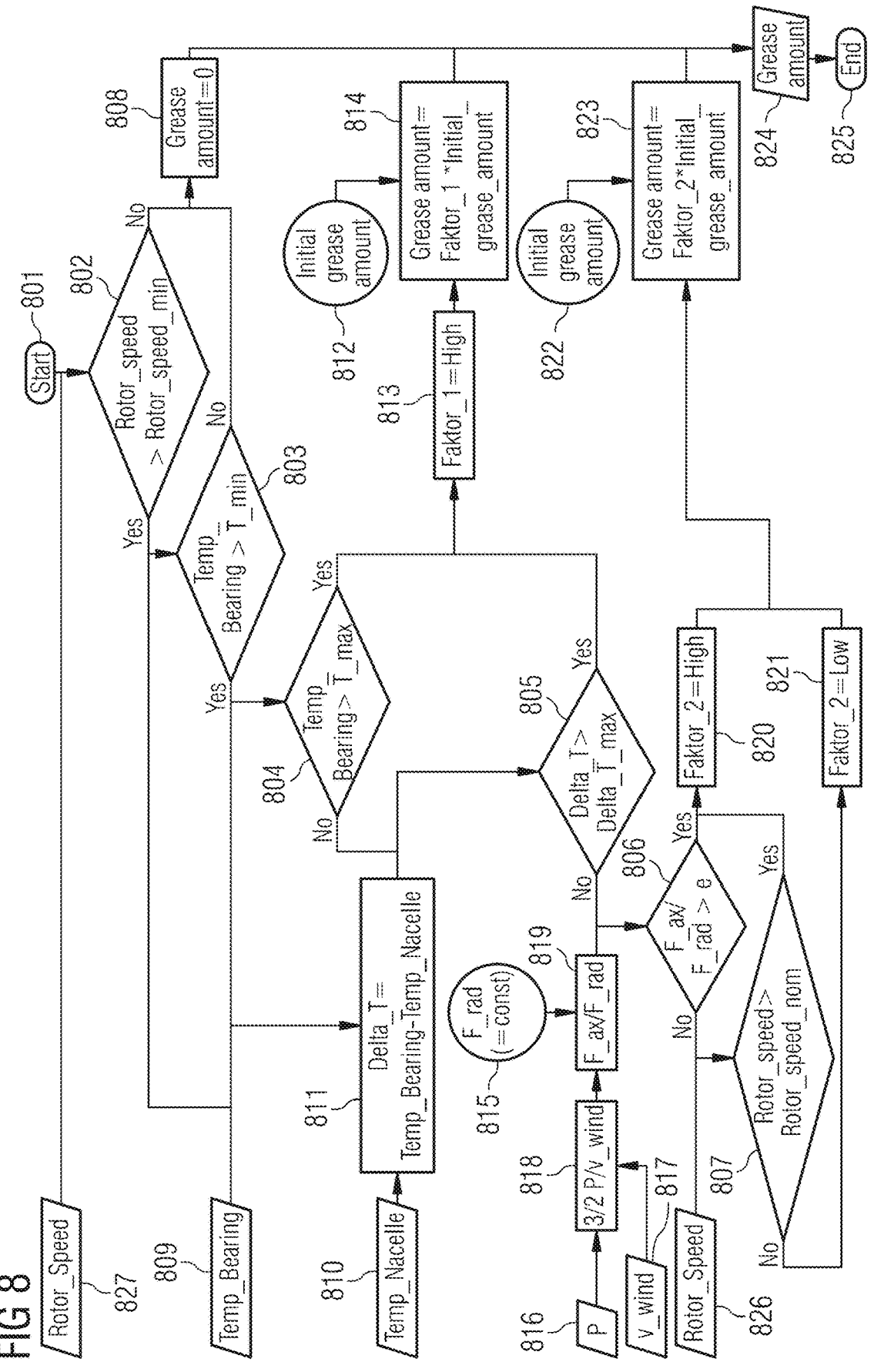
FIG. 8 is a schematic view of a flowchart of a method according to an embodiment; and, FIG. 9 is a schematic view of a ratio curve and a threshold according to an embodiment.

FIG. 8 shows a flowchart of a method for lubricating the bearing 103 according to a further embodiment.

In a step 801 the method starts.

In a step 827 the value of the rotor speed of the rotor 108 is determined.

In a step 802 the determined rotor speed is compared to a predefined minimum rotor speed. In the case that the determined rotor speed is greater than the predefined minimum speed, the method continues with a step 803. In the case that the determined rotor speed is not greater than the predefined minimum speed, the method continues with step 808.

In step 808 it is determined that a needed amount of lubricant, for example, grease or oil, is zero.

In a step 809 the temperature of the bearing 103 is determined.

In a step 803 the determined bearing temperature is compared with a predefined minimum temperature. In the case that the determined bearing temperature is not greater than the predefined minimum temperature, the method continues with step 808.

In the case that the determined bearing temperature is greater than the predefined minimum temperature, the method continues with a step 804.

In the step 804, the determined bearing temperature is compared to a predefined maximum temperature. In the case the determined bearing temperature is greater than the predefined maximum temperature, the method continues with the step 813. In the case that the determined bearing temperature is not greater than the predefined maximum temperature, the method continues with the step 805.

In the step 813 a gain factor is specified. In addition, in a step 812 an initial grease amount is provided. The initial grease amount corresponds to the grease amount independent of the loads acting on the bearing 103.

In a step 814 the initial grease amount of step 812 and the gain factor of step 813 are multiplied with each other to determine the amount of grease that should be supplied to the bearing 103. In the step 813, the gain factor is set to high, such that a high amount of grease is supplied to the bearing 103.

Afterwards the determined grease amount is provided with the lubricant supply signal in a step 824. In particular, the determined grease amount is supplied to the bearing 103 by the lubricant supply system 200, in particular the lubricant supply device 202 and the lubricant supply units 203.

To continue with the step 805, a temperature inside the nacelle 106 is determined in a step 810.

In a step 811 a temperature difference is determined between the bearing temperature of step 809 and the nacelle temperature of step 810.

In the step 805 it is determined whether the temperature difference of step 811 is greater than a predefined maximum temperature difference. In the case that the temperature difference is greater than the predefined maximum temperature difference the method continues with step 813.

In the case that the temperature difference is not greater than the predefined maximum temperature difference, the method continues with step 806.

To continue with step 806, the mechanical power 405 and/or the electrical power 406 are determined in a step 816. The wind speed is determined in a step 817. In a step 818, an estimation formula is used to determine the axial load acting on the bearing 103. For example, the formula is 1.5 multiplied with the power of step 816 divided by the wind speed of step 817.

In a step 815 the radial load is determined. For example, the radial load is constant.

In a step 819, the ratio of the axial load and the radial load is determined.

In a step 806 it is determined whether the ratio of the axial load and the radial load is greater than a predefined threshold. In the case that the ratio is higher than the threshold, the method continues with step 820.

In a step 820 a second gain factor is set to high, such that the amount of grease to be supplied to the bearing 103 is high.

In the case that the ratio of the axial load and the radial load is not greater than the given threshold, the method continues with step 807. In step 807, it is determined whether the rotor speed of step 807 is greater than a nominal rotor speed of the rotor 108, which is determined in a step 826. In the case that the determined rotor speed is greater than the nominal rotor speed, the method continues with step 820.

In the case that the determined rotor speed is not greater than the nominal rotor speed, the method continues with a step 821.

In step 821 the second gain factor is set to low, in particular lower than in step 820, such that the amount of grease to be supplied to the bearing 103 is low. After step 820 and step 821 the method continues with a step 823. In step 823, the initial grease amount, which is provided in step 812 or comparably in step 822, is multiplied by the second gain factor to determine the grease amount. The grease amount is then used in step 824 to supply the desired amount of lubricant (for example, grease) to the bearing 103. After that the method ends in a step 825.

The flowchart and method according to FIG. 8 is just one illustrative embodiment of how the method according to this disclosure can be realized. Not all described method steps are necessarily to be implemented and other method steps could be added as alternatives or in addition.

Figure 9:
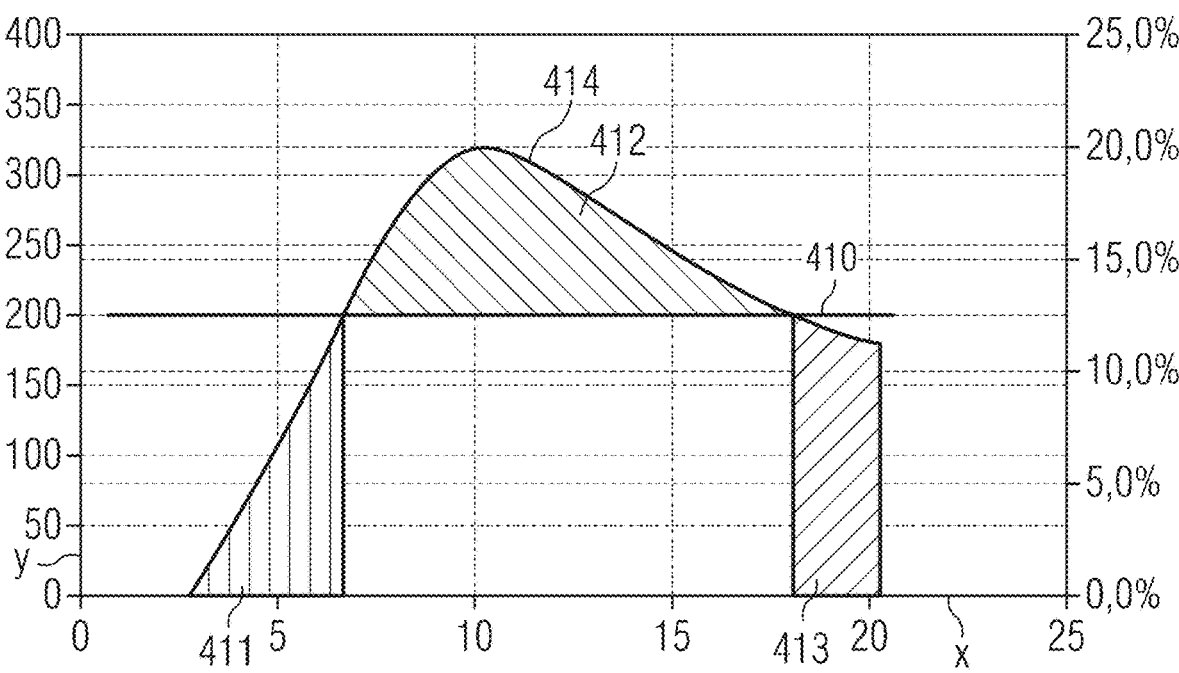

FIG. 9 shows an embodiment of the ratio 414 of the axial load and the radial load and a predefined threshold 410. The x-axis indicates the wind speed.

Starting at a low wind speed, the ratio 414 is below the threshold 410 and the speed of the rotor 108 is low. The operating condition of the bearing 103 is thus characterized by a low ratio 414 and a low rotational speed. The operating condition is classified in a first class 411, representing a first damage potential. In the first class 411, the damage potential is comparably low and, for example, no additional lubrication in addition to a standard lubrication is needed.

If the ratio 414 of the axial load and the radial load is greater than the threshold 410, the operating condition is classified in a second class 412. In the second class 412 the speed of the rotor 108 is comparably high and in particular greater than in the first class 411. The second class 412 represents a second damage potential which is higher than the first damage potential, such that additional lubrication is needed. For example, the quantity and/or frequency of lubrication is increased.

If the wind speed continues to increase, the ratio 414 between the axial load and the radial load decreases and at some point is no longer greater than the threshold 410. The rotor speed is comparably high, in particular greater than in the first class 411 and in the second class 412. In this situation, the operating condition is classified in a third class 413. For example, the third class 413 represents a third damage potential which is lower than the second damage potential but higher than the first damage potential, such that an additional lubrication is needed, however not as much as for the second damage potential In further embodiments, more or other variables than the rotor speed are considered to characterize the operating condition of the bearing 103 and to classify the operating condition according to its damage potential. It is also possible to have only two different damage potential classes or more than three classes.

The method and system realize a reliable lubrication of the bearing 103 dependent on the actual loads and thus the risk of damage and wear is reduced. For example, information about quantity and frequency of lubricant supply can be registered or stored in order to forecast the next refill of the lubricant reservoir. Disturbing variables such as induced current, for example caused by pitch electrical motors, or ambient temperature, can be also be taken into account to make the determinations more precise. It is also possible to limit the active power of the wind turbine 100 or the rotor speed depending on the determined damage potential and/or damage sum, for example if sufficient lubrication is not possible. For example a vibration measurement and/or classification is considered.

By taking into account the axial loads and radial loads acting on the bearing 103 during operation, improved lubrication of the bearing 103 is possible. The lubrication can be adapted to the current rotor bearing operating condition. This makes a reduction of the wearing of the rotor bearing 103 possible. The lubricant is used in an efficient way. In operating conditions, in which less lubricant is required, less lubricant can be supplied to the bearing 103. On the other hand, if more lubricant is required for a damage-free operation, lubrication can be increased. Thus, the lubricant is used in an efficient way.

It is understood that the foregoing description is that of the preferred embodiments of the invention and that various changes and modifications may be made thereto without departing from the spirit and scope of the invention as defined in the appended claims.

REFERENCE SIGNS 100 wind turbine
102 tower
103 bearing
104 foundation
105 shaft
106 nacelle
107 region
108 rotor
110 rotor blade
112 rotor hub
200 lubricant supply system
201 control unit
202 lubricant supply device
203 lubricant supply units
211, 212, 213 sensor
301-303 method steps
401 axial load
401a axial load
401b axial load
402 radial load
404 axial load
405 mechanical power
406 electrical power
410 threshold
411 first class
412 second class
413 third class
414 ratio of the axial load and the radial load
801-827 method steps

The invention claimed is:

1. A method for lubricating a bearing of a wind turbine, the method comprising:
   determining a load condition of a load acting on the bearing;
   determining an operating condition of the bearing in dependence upon the determined load condition;
   determining a damage potential of the bearing in dependence upon the determined operating condition;
   providing a lubricant supply signal in dependence upon the determined damage potential, wherein the lubricant supply signal includes information about supplying lubricant to the bearing;
   determining the load condition by determining an axial load and a radial load applied on the bearing; and,
   determining the operating condition in dependence upon at least one of the determined axial load and the determined radial load.

2. The method of claim 1 further comprising:
   determining at least one dynamic parameter based on at least one of a model calculation and sensor data provided by at least one sensor; and,
   determining the load condition dependent on the at least one dynamic parameter.

3. The method of claim 1, wherein at least one of said determining the load condition and said determining the operating condition is based on at least one of:
   a rotation speed of a rotor of the wind turbine;
   a rotor power;
   a power generated by the wind turbine;
   a wind speed;
   an air density;
   a bearing temperature;
   a difference between a bearing temperature and a temperature within a nacelle of the wind turbine;
   a blade pitch angle; and,
   a load acting on at least one rotor blade.

4. The method of claim 1 further comprising determining the load condition in dependence upon at least one static parameter.

5. The method of claim 1 further comprising determining the load condition in dependence upon at least one of a wind shear, a rotor property and a bearing property.

6. The method of claim 1 further comprising:

determining the load condition by determining an axial load and a radial load applied on the bearing; and, determining the operating condition in dependence upon a ratio between the determined axial load and the determined radial load.

7. The method of claim 1, wherein the axial load is determined based on at least one of a power generated by the wind turbine and on a wind speed; and, the radial load is determined based on at least one of the power generated by the wind turbine and a rotor property.

8. The method of claim 1, wherein the axial load is determined based on at least one of a power generated by the wind turbine and on a wind speed; and, the radial load is determined based on a rotor weight.

9. The method of claim 1 further comprising determining the operating condition of the bearing in dependence upon the determined load condition and on at least one of a rotation speed of a rotor of the wind turbine, a bearing temperature, and a difference between a bearing temperature and a temperature within a nacelle of the wind turbine.

10. The method of claim 1, wherein the lubricant supply signal includes at least one information about:

a quantity of lubricant supplied to the bearing in dependence upon the determined damage potential;

a frequency of lubricant supplied to the bearing in dependence upon the determined damage potential; and, a region of the bearing where the lubricant is applied in dependence upon the determined damage potential.

11. The method of claim 1 further comprising:

adding the determined damage potential to a damage sum cumulating the determined damage potential over time, providing the lubricant supply signal dependent on the determined damage potential and on the damage sum and/or providing a maintenance signal dependent on the determined damage sum, wherein the maintenance signal includes information about a maintenance in addition to supplying lubricant to the bearing.

12. The method of claim 1, wherein said determining the damage potential includes:

comparing the operating condition with at least one predefined threshold.

13. The method of claim 12 further comprising:

classifying the operating condition based on the comparison between the operating condition and the at least one predefined threshold into one of a plurality of classes, wherein each class corresponds to a different damage potential.

14. The method of claim 1, wherein the bearing is a roller bearing.

15. The method of claim 1, wherein the bearing is a spherical roller bearing or a tapered roller bearing.

16. The method of claim 1, wherein the bearing is a rotor bearing.

17. A lubricant supply system for a wind turbine, the lubricant supply system comprising:

a control unit including a processor and a non-transitory computer readable storage medium having program code stored thereon;

a lubricant supply device;

said control unit being configured to control said lubricant supply device;

said program code being configured, when executed by said processor, to:

determine a load condition of a load acting on a bearing;

determine an operating condition of the bearing in dependence upon the determined load condition;

determine a damage potential of the bearing in dependence upon the determined operating condition;

provide a lubricant supply signal in dependence upon the determined damage potential, wherein the lubricant supply signal includes information about supplying lubricant to the bearing;

determine the load condition by determining an axial load and a radial load applied on the bearing; and, determine the operating condition in dependence upon at least one of the determined axial load and the determined radial load.

18. The lubricant supply system of claim 17, wherein said lubricant supply device includes a plurality of lubricant supply units to supply the lubricant to different regions of the bearing.

19. A wind turbine comprising:

a bearing;

a lubricant supply system coupled with said bearing to supply lubricant to said bearing;

said lubricant supply system having a lubricant supply device and a control unit including a processor and a non-transitory computer readable storage medium having program code stored thereon;

said control unit being configured to control said lubricant supply device;

said program code being configured, when executed by said processor, to:

determine a load condition of a load acting on said bearing;

determine an operating condition of said bearing in dependence upon the determined load condition;

determine a damage potential of said bearing in dependence upon the determined operating condition;

provide a lubricant supply signal in dependence upon the determined damage potential, wherein the lubricant supply signal includes information about supplying lubricant to said bearing;

determine the load condition by determining an axial load and a radial load applied on the bearing; and, determine the operating condition in dependence upon at least one of the determined axial load and the determined radial load.

20. The wind turbine of claim 19, wherein said bearing is a roller bearing.

21. The wind turbine of claim 19, wherein said bearing is a spherical roller bearing or a tapered roller bearing.

22. The wind turbine of claim 19, wherein said bearing is a rotor bearing.

* * * * *